April 22, 1930.  B. K. KIRK  1,755,925
LOCOMOTIVE FRAME
Filed Jan. 29, 1929
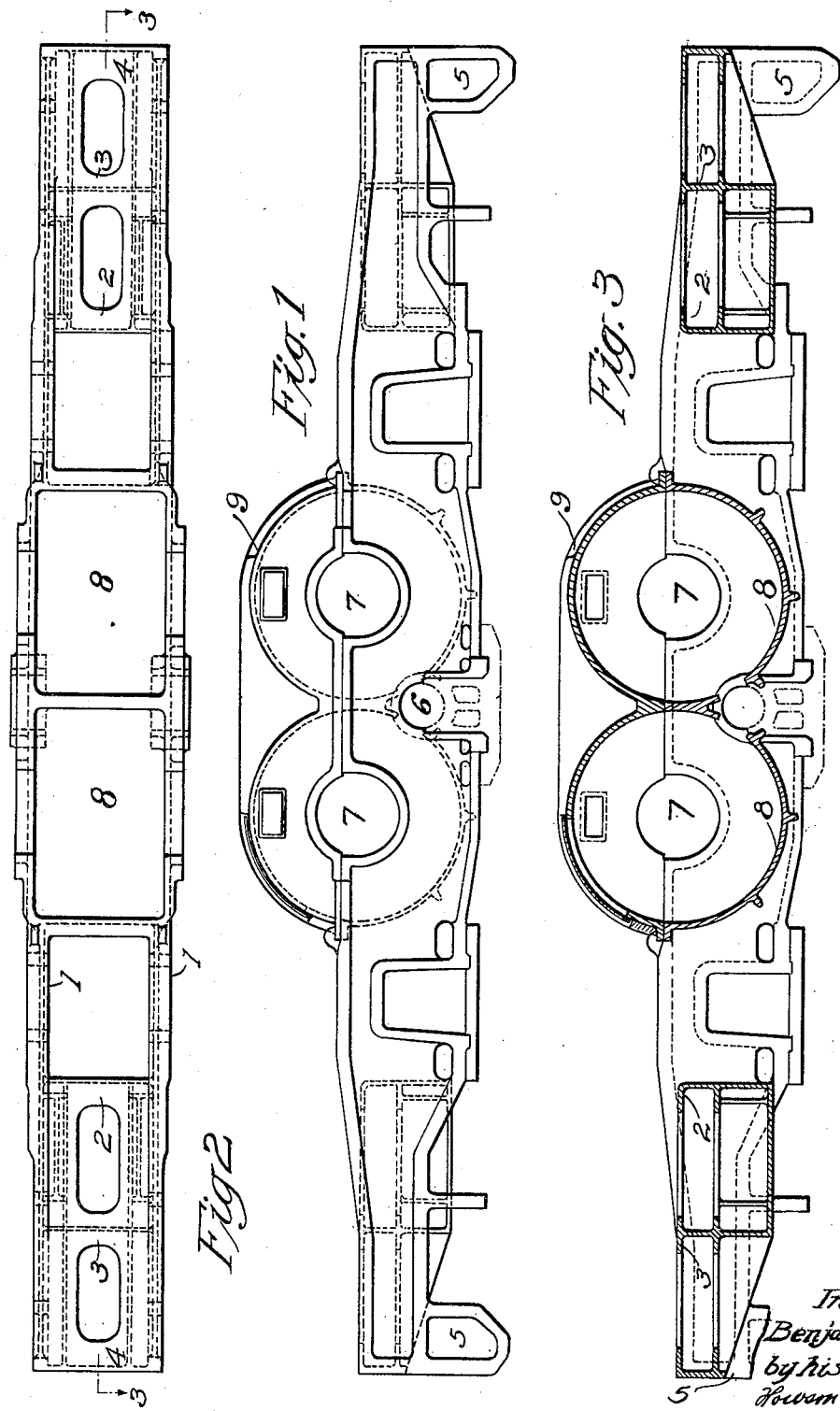

Patented Apr. 22, 1930

1,755,925

UNITED STATES PATENT OFFICE

BENJAMIN K. KIRK, OF PHILADELPHIA, PENNSYLVANIA

LOCOMOTIVE FRAME

Application filed January 29, 1929. Serial No. 335,865.

The object of my invention is to design a cast steel frame for an electric locomotive, in which the motor cradles, cross-ties and bumpers are cast integral with the side frames.

In the accompanying drawing:

Fig. 1 is a side view of a frame for an electric locomotive illustrating my invention;

Fig. 2 is a plan view; and

Fig. 3 is a longitudinal sectional view on the line 3—3, Fig. 2.

The structure consists of side frames 1—1, spaced apart as shown in Fig. 2 and connected at each end by cross-ties 2, and thus the cross-ties form with the end bumper member 4 a substantial end frame. Depending from the end member 4 are the heavy main bumpers 5.

Each side frame, in the present instance, has two sets of pedestals, spaced a given distance apart for the axles of the locomotive. While two sets of pedestals are shown, the frames may have more than two sets, depending upon the type and size of the locomotive.

At the centre of the structure is a bearing 6 for a jack-shaft, and on each side of the bearings are bearing-openings 7 for the motor shafts. Connecting the frames at these points are cradles 8 made integral with the frames and suitably machined to receive the electric motors, including their armatures and field pieces. The jack-shaft is driven by the twin motors (two armatures per jack-shaft) through single reduction gears.

The cradles in the present instance are located between the two driving axles, but they may be located at one or both ends of the frame outside the driving wheel base, if desired.

This frame may be built to accommodate any type of truck, whether two or four-wheeled and either centre or side bearing type, at one or both ends of the structure. In the drawing provision is made for a two-wheeled side bearing truck at each end of the locomotive.

The motors are enclosed by a cap 9 which extends over both cradles as shown in Figs. 1 and 3 and is made separate from the structure and secured in place by bolts or other fastenings.

The frame may be equipped with suitable pads and brackets which may be finished and located that the cab underframe and cab may be attached directly to or suitably supported, so that the entire superimposed load may be safely carried.

The invention is designed particularly for heavy road and switching side rod locomotives. The bumpers may be arranged to take friction draft gears when desired.

I claim:

The combination in an electric locomotive frame; two side frames having pedestals for axles and bearings for a jack-shaft; two cradles for the motors, one cradle being on one side of the line of the jack-shaft and the other on the opposite side thereof; and a motor cradle cap enclosing both motors and detachably mounted on the frame.

BENJAMIN K. KIRK.